United States Patent Office 3,383,439
Patented May 14, 1968

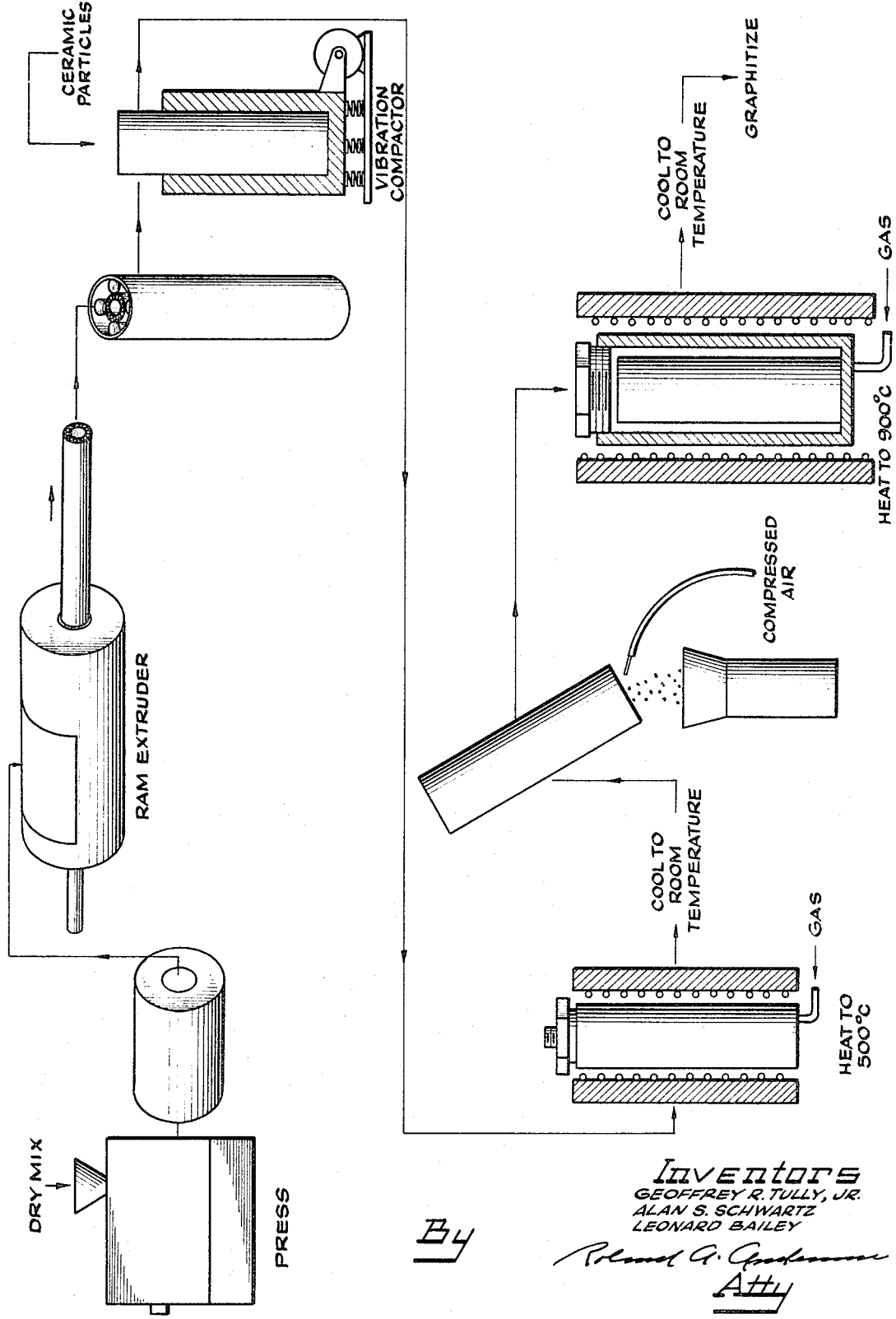

3,383,439
PROCESS FOR MAKING GRAPHITE
Geoffrey R. Tully, Jr., Poway, Alan S. Schwartz, Del Mar, and Leonard Bailey, Poway, Calif., assignors, by mesne assignments, to the United States of America as represented by the United States Atomic Energy Commission
Filed Mar. 18, 1965, Ser. No. 440,965
10 Claims. (Cl. 264—29)

ABSTRACT OF THE DISCLOSURE

This invention concerns a process for making graphite products by heating the green article under restraint, cooling the article and relieving the restraint, and reheating.

---

This invention relates to a method of making graphite products and more particularly to an economical method of making graphite products having characteristics which make them fully acceptable for use in nuclear reactors.

Because of their inherent temperature-resistant characteristics and because of their nuclear characteristics, graphite products are potentially useful in a number of ways in nuclear reactors. Moreover, they are particularly useful in gas-cooled reactors which operate at high temperatures. For graphite products to be suitable for actual applications, they should have excellent structural characteristics. For example, graphite products which are used as fuel element components in a high temperature gas-cooled reactor should have high density and be free from defects, such as cracks, which would otherwise impair their performance over prolonged periods of operation at high temperatures, the intended environment in such a reactor.

Competitive cost, which is always a factor in a commercial application, requires that there should be methods for economically producing graphite products. Moreover, it is necessary that many graphite products for use in nuclear reactors be held to close dimensional tolerances. Numerous attempts have been made to provide processes for making graphite products to the above-mentioned specifications. None of these processes has proved entirely successful. Whereas initially processes for making graphite often entailed as long as two hundred days of baking, cooling, shaping etc. to produce suitable products, headway has been made in reducing the time required to produce graphite products having the desired structural characteristics. However, to achieve the desired structural characteristics, a week or more is yet required.

It is the principal object of the invention to provide an improved method for making graphite products. Another object is to provide a method for making dense graphite products which are free from structural defects and which have good structural strength. A further object is to provide an economical method for making elongated graphite products to precise dimensions and with very good structural characteristics. A still further object is to provide an economical process for making graphite products of substantial length which are suitable for prolonged use at high temperatures in operating nuclear reactors. These and other objects of the invention are more particularly set forth in the following detailed description and in the accompanying drawing wherein one process embodying various of the features of the invention is diagrammatically illustrated.

In general, the invention provides a process for making graphite products which reduces production time to less than a week without undesirably affecting the structural characteristics of the final products. In this process, green articles are baked in such a manner that the necessary baking time is significantly reduced and that the dimension of the final products can be held within fairly narrow tolerances. Thus, machining costs can be eliminated, and the overall cost of the graphite product can accordingly be kept relatively low. Moreover, the process is especially suitable for the production of graphite products having complex shapes.

In this process for making graphite products, two separate baking cycles are employed. In the first cycle, a green article is baked for a predetermined period in a restrained condition. In the subsequent baking cycle, the article is baked without restraint.

A green article of the particular shape desired is initially formed from a mixture of particulate carbonaceous material and suitable carbonizable binder. Preferably, graphite is employed as the carbonaceous material although other low-volatile forms of carbon may also be used. The mixture of binder and carbonaceous material should be substantially homogeneous so that the composition and texture is uniform throughout. The mixture, exclusive of any solvents used, should contain at least about 60% by weight of particulate carbonaceous material and preferably at least about 85%.

During the baking cycles, the volatiles in the binder are driven off and the non-volatile material is substantially carbonized as a result of the temperatures employed. Because the initial mixture perferably utilizes particulate graphite as a base material, instead of some other form of carbon containing a fair percentage of volatile material, such as raw coke, the total amount of volatiles driven off is relatively small. Additionally, if some of the green mixture is initially in graphite form, the total dimensional change is kept relatively small, and the characteristics of the final product are accordingly improved.

The initial green article can be formed in any suitable manner, hot pressing and extrusion being examples of suitable ways of forming. In many instances, extrusion is preferred because it lends itself to the production of articles relatively long in length, e.g., tubes, rods, etc., and also lengs itself to the production of articles complex in cross-sectional shape, e.g., having a plurality of longitudinal holes within the wall of a thick-walled tube.

In formulating the mixture for making the green article, the particular forming process which is to be used should be considered. Different forming processes may require slightly different composition feed mixtures. In general, graphite flour is the preferred base material. To the graphite flour there are added binders, such as coal tar pitch and ethylcellulose. If extrusion is used to form the green articles, a suitable lubricant, such as stearic acid, may be included. A suitable solvent, such as trichloroethylene, is employed to dissolve the binders in formulating the mixture.

The green article is heated in restrained condition in the first baking cycle and then cooled to room temperature. It has been found that, by the selection of times, temperatures, and rates of heating and cooling for this first heating cycle, the dimensions of the restrained article can be set so that subsequent thermal treatment can be applied to the article in an unrestrained condition without undesirably affecting the dimensions or structural characteristics of the resultant product. Because the article may be subjected to subsequent thermal treatment in unrestrained condition, which treatment completes the carbonization, reduction of the total time for the production of the graphite product is facilitated.

One method of heating the green article with physical restraint applied to its surfaces is described in detail below wherein particulate ceramic material is compacted against the surfaces of the green article. Other suitable methods of heating under restraint as are obvious to one skilled in the art may also be used.

In the preferred method of heat treatment, the green article is placed in a suitable container, such as a steel or a graphite container, which has a cavity sufficient to accommodate the green graphite article. In such a container, three or four positioning rods may be used to precisely space the outer surface of the green article from the inner surface of the cavity of the container. The space between the outer surface of the article and inner surface of the container cavity is filled with a porous restraining medium which provides the desired support between container and article during the first baking cycle.

The porous restraining medium preferably comprises small particles of ceramic material, such as aluminum oxide, silicon oxide, etc., which are packed in place using vibration compaction to provide the desired amount of restraint to inhibit deformation of the green article during the first baking cycle. If the green article contains one or more internal holes, as for instance when it is tubular in shape, these holes are likewise filled with porous retraining media at the same time as it is packed about the outside of the article. To reduce the amount of ceramic material necessary to fill these holes, it is often desirable to place a metal or ceramic rod in the center of the hole, thus reducing the space to be filled to the annular space surrounding the rod. Employment of such a rod increases the rigidity of the restraining media and accordingly reduces the amount of internal shrinkage of the tube which is permitted to occur. Preferably, the rod should not occupy more than about one-third of the volume of the hole.

To achieve the desired restraint, ceramic particles of a suitable size are employed. In general, oversize particles are avoided for they might not provide intimate surface contact with the green article. Also, ceramic particles which are too small are avoided because of the possibility that they might inhibit gas evolution from the green article. Ceramic particles in the size range between about 840 microns (20 mesh) and about 105 microns (150 mesh) are preferable.

In general, the ceramic particles are packed tight enough to substantially eliminate thermal distortional changes in the green article but not so tight as to prevent some slight yielding of the particulate media, especially in an internal bore, to accommodate a very slight amount of shrinkage of the green article during baking. Vibration compaction is regulated to avoid such over-packing which could result in distortion of the green article because of the shrinkage which occurs. By filling the void spaces within the container with compacted ceramic particles so that they restrain any significant movement of the surfaces of the green article during baking, the dimensions of the resultant product are closely controlled.

Before starting vibration, the container is first filled with ceramic particles to a level about 2 inches above the top of the green article. During the time of vibration, additional ceramic particles are added as required. The frequency, amplitude and time of the vibration compaction are regulated to provide the desired density of particulate ceramic material which has been found to give the desired amount of restraint. The particle size of the particulate ceramic material is given some consideration in determining the parameters of vibration. For example, if aluminum oxide particles having a particle size between about 150 microns to 840 microns are employed, vibration compaction may be carried out at about an amplitude of about five-hundredths of an inch and a frequency of from about 10 c.p.s. to about 40 c.p.s. for a time period of about 5 minutes. Preferably, the frequency of vibration is altered over a range of frequencies during vibration compacting to achieve the desired density of ceramic material.

An important criterion in assuring that sufficient compaction is obtained to provide the desired restraint, without over-packing, is the increase in density of the ceramic material. It has been found that compacting to increase the density of the unpacked ceramic material (i.e., the density of ceramic particles initially poured in the container) by about 10% provides the desired restraint. As long as about a 10% increase in density is achieved, the particular amplitude and frequency of vibration employed is of reduced significance. The increase in density is easily measured by first measuring the amount of particulate ceramic material it takes to initially fill the container to the desired level. Then, during vibration compacting, about 10% of this initial amount is added as compacting progresses, and vibration is continued until the desired level in the container is again reached.

After the added ceramic material is again at the desired level, e.g., about 2 inches above the top of the green article, a lid is placed on the container. The lid includes a movable underplate which is then screwed down onto the top of the ceramic powder to assure that the packing remains tight during the first baking cycle.

The container lid contains some small weep holes which allow the volatiles from the materials in the green article to escape. A gas inlet is preferably provided at the bottom of the container so that a purge flow of a suitable inert gas, preferably nitrogen for economic reasons, may be passed through the container to assure the removal of the volatiles which are produced by the decomposition of the pitch and other binder materials during carbonization thereof in the first baking cycle. The inherent porosity of the ceramic powder restraining media permits the volatiles to easily escape from the surfaces of the green article and thence from the container. In addition, this porous media allows a uniform purge gas flow to be established past the outer surface of the green article and through any internal holes which the article may contain, assuring removal of volatiles from the container.

Although heretofore the green article has been spoken of as though it were a single piece, there is no reason why the green article may not be a composite made up of a plurality of separate pieces. It may often be feasible to use such a plurality of pieces to facilitate fabrication of a graphite product of a particular shape. For instance, elongated fuel elements, which are disposed in close proximity to one another in the core of a nuclear reactor, are often spaced minimum distances apart via the use of spacing rings at predetermined locations on the fuel elements.

It is convenient to make such a fuel element by extruding a long cylindrical tube of green material and separately forming a spacer ring of similar green material. The ring is slipped over the tube and located at the desired position before the tube is packed in the restraining ceramic particles. By disposing the interior surface of spacer ring in contact with outer lateral surface of the tube and then compacting the ceramic particles thereabout, it has been found that a strong bond is established during the first baking cycle so that the spacer ring becomes integral with the tube, thus providing the desired complex-shaped graphite product.

In the first baking cycle, the green article is slowly heated to the temperature at which initial carbonization takes place and volatiles are driven off. The green article is preferably brought up to this temperature at a rate of not more than about 10° to about 15° C. per hour, the total period taking about two days, depending upon the final temperature. Initial restrained baking should be carried out at a temperature between about 450° C. and about 600° C., and preferably from about 475° C. to about 550° C.

The green article is baked for a period of time sufficient to remove most, i.e., at least about 80%, of the total portion of the binder materials which are eventually volatilized in both baking cycles. When pitch is used as a binder, approximately one-half of the weight of the pitch is evolved in this initial restrained baking step. Total necessary baking time varies somewhat with the bulk or weight of the article and, of course, with the particular temperature being used. For example, for a tubular green article weighing about 23 kg., baking at about 450° C. is carried out for at least about 24 hours; whereas if a temperature of 600° C. is used, and if the article is heated from 450° C. to 600° C. over a period of about 10 hours, it need only be held at 600° C. for at least about 4 hours. Obviously, time-temperature periods equivalent to these periods, as would be well known to one skilled in the art, may also be used. Moreover, longer periods may also be used, but for the economic considerations. Preferably, a green article of about this size is baked at about 500° C. for about 18 hours.

The baking may be carried out in an electric furnace or in any suitable heating apparatus. The green article is preferably disposed with its longitudinal axis in the vertical position during the first baking cycle, but a horizontal orientation has also been found satisfactory. A slow purge flow of nitrogen, at least about 5 cu. ft. per minute, is maintained throughout this entire first baking cycle to assure removal of the volatiles. With the article in vertical position, a uniform purge flow of gas easily reaches all surfaces of the green article.

At the completion of the baking period, the baked article is slowly cooled to ambient temperature. Preferably, cooling is carried out within the furnace so as not to subject the baked article to any sudden temperature change. The cooling period should be at least about five hours to avoid creation of any undesirable stresses. In any respect, whether cooling is carried out within the furnace or outside it, the baked article is not removed from the container until after it has been cooled to substantially ambient temperature.

After cooling is completed, the lid is removed from the end of the container, and the ceramic restraining media are removed by any suitable means. It has been found convenient to blow a stream of gas or air under pressure into the container to loosen the individual particles and let them fall out. Removal is, of course, carried out over a suitable receptacle in which the falling ceramic particles are collected.

When the particulate ceramic material has been removed, the baked article is ready for the second baking cycle. The second baking cycle may be carried out in the same container as was the first baking cycle, or another container may be used that is made of a material, such as stainless steel, that is especially resistant to the higher temperatures which will be encountered. No restraining material is used during the second baking cycle; instead, the baked article is disposed in unrestrained condition. Because the article is free to move within the container, the article is completely unaffected by any difference in its coefficient of thermal expansion and the coefficient of expansion of the container in which it is disposed. At the higher temperatures used in the second baking cycle, such a difference in amount of thermal expansion could be significant, depending of course upon the material from which the container is made.

In the second baking cycle, the article is initially returned, over a period of about six to eight hours, to about the temperature employed in the first baking cycle. From this point, the article is slowly heated to the final carbonization temperature. Final carbonization is preferably carried out at a temperature above about 850° C. and usually at between about 850° C. and about 1000° C.

Heating to increase the temperature from the level of the first baking cycle to the final carbonization temperature is preferably carried out at between about 20° C. per hour and about 100° C. per hour. Too rapid heating increases the probability that cracks may develop in the article. It has been found that final carbonization is accomplished by maintaining the article at or above about 850° C. for about three to ten hours. Obviously, time-temperature periods which are equivalent may also be used, as well as longer periods. Preferably, a temperature of about 900° C. is maintained for about four to eight hours. Because volatiles are likewise evolved during the second baking cycle, a slow purge flow of nitrogen, of at least about 5 cubic feet per minute, is employed to remove these volatiles.

After the completion of the second baking cycle, the carbonized article is ready for graphitization. Graphitization is carried out at this point even though the particulate carbonaceous material used in the green mixture was graphite flour. Graphitization transforms the carbon which was deposited from the pitch and other binders during the first and second baking cycles into graphite, thus assuring that the entire product is graphitic in form.

Any suitable method of graphitization may be employed. The entire article may be heated to about 2600° C. If the carbonized article is elongated in shape, it may be more convenient to pass it through a continuous graphitization furnace wherein a heating zone is maintained above the graphitization temperature.

Graphitization may be carried out immediately, or the product may first be cooled to room temperature and graphitization reserved to a later time. If the container is suited to be heated to necessary temperature, as would be the case where a graphite container is used, it may be convenient to graphitize immediately. If the product is first cooled to room temperature, cooling is carried out slowly to avoid any sudden temperature change. Cooling at a constant rate over a period of about six hours is preferred.

The resultant graphite products have excellent structural strength and densities of greater than 1.5 grams per cc. These products are free from cracks and are considered excellently suited for use as components of fuel elements for nuclear reactors. To increase the densities of these products even further, and also to further reduce their porosity to gas, the products can be treated with carbonizable impregnants and later carbonized and graphitized, as is well known in the art.

The following examples further illustrate certain features of the present invention.

Example I

A cylindrical tube of green material, shaped for use as a portion of a nuclear fuel element, is extruded having eight longitudinally extending fuel holes evenly spaced in the tube wall. The green article has an outer diameter of 3.525 inches, an inner diameter of 2.810 inches and a length of four feet. The fuel holes have diameters of about one-fourth of an inch.

The green article is hot-extruded from a pre-formed billet, using an extrusion die temperature of about 120° C. and a force of about 250 tons on a ram 10 inches in diameter. This temperature of 120° C. is such that the pitch in the green material is fluid. The end of the extrusion die is water cooled to chill the pitch and set the green article just as it leaves the die. The billet weighs approximately 22.7 kilograms and is made from an original mixture of the following materials:

| | | |
|---|---|---|
| GP-38 graphite flour (200 mesh) | grams | 15,515 |
| Ethylcellulose | do | 657 |
| Coal tar pitch | do | 6048 |
| Stearic acid | do | 430 |
| Trichloroethylene | liters | 37.85 |

In forming the billet, the ethylcellulose and the pitch are first dissolved in the trichloroethylene and then mixed with the stearic acid before the graphite flour is added. Suitable apparatus, such a muller or a Hobart mixer, is used to assure a uniform mixture is obtained. The mixture is agitated until it is in the form of balls about ⅛ to ¼ inch in diameter. The balls are initially dried in a tray dryer at about 50° C. for about 12 hours to drive off most of the solvent. They are then inserted into the chamber of a horizontal press heated to about 150° C. A pressure of about 400 p.s.i. is applied for about five minutes to cake these balls into a hollow cylindrical billet having an outer diameter of about 10 inches, an inner diameter of about 4 inches and a length of about 15 inches.

The extruded green article is placed in a steel container having an inner diameter of about 4¼ inches. Four steel spacing rods, each ¼ inch in diameter, are disposed at 90 degree intervals along the inner wall of the steel container. Aluminum oxide particles, having a particle size range between about 150 microns and about 840 microns, cover the bottom of the container to a depth of about two inches. The green tube is set atop this bottom layer of aluminum oxide particles and is spaced from the inner wall of the steel container by the four steel rods. A 1½ inch diameter steel rod is set in the center of the tube, and aluminum oxide of the same particle size is poured around the periphery of the green tube and into the center bore and the fuel holes to a level about 2 inches above the top of the tube.

The entire assembly is then placed on a vibrator, the amplitude is set at 0.05 inch, and the frequency of vibration applied is varied between 10 and 40 c.p.s. every 40 seconds. The four steel spacing rods are removed from around the inner wall of the steel container, and additional aluminum oxide particles are continuously added in an amount equal to 10% of the total weight of the particles initially poured into the container plus the weight of sufficient particles to fill the space vacated by the four steel rods. Vibration is continued until the additional ceramic particles have been added and the level has reached the original mark 2 inches above the top of the tube. The entire vibration compaction takes about 5 minutes.

The lid is placed on the container, and the movable plate is screwed down against the top of the aluminum oxide particles. The container assembly is placed vertically within a wire wound resistance furnace and slowly raised to baking temperature. A gas line is attached to the bottom of the container, and nitrogen is passed through the container at a rate of about five cubic feet per hour. The furnace control is regulated so that the heat of the green tube within the container is gradually increased to 500° C. over a period of 40 hours. After reaching 500° C., this temperature is maintained for about 18 hours. At the completion of this period, the baked tube is slowly cooled to room temperature. Cooling is carried out in the furnace over a period of about 4½ hours.

At the completion of the cooling period, the lid is removed from the container, and the container is inverted over a suitable receptacle. The particulate aluminum oxide which serves as the restraining medium is removed using a piece of copper tubing connected to a source of compressed air. After removal of the particulate aluminum oxide is complete, the baked tube is transferred to a stainless steel container having a cavity slightly larger than the tube. A purge flow of nitrogen about five cubic feet per hour is fed through the stainless steel container which is vertically disposed within the wire wound resistance furnace. The temperature of the tube is returned to 500° C. by heating at a rate of increase of about 50° C. an hour over an eight hour period. After the tube reaches 500° C., the rate of temperature increase is reduced to about 25° C. an hour so that after about 16 hours the temperature reaches 900° C. Baking is carried out at 900° C. for about six hours.

At the conclusion of this period, heating is discontinued, and the tube is allowed to remain in the furnace wherein it is cooled to room temperature over a period of about six hours. The carbonized tube is removed from the stainless steel container and closely examined. No cracks or breaks are discovered. The outer diameter measures 3.510±0.002 inches. The inner diameter of the central bore measures 2.750±0.003 inches. The four foot tube has a maximum bow of less than 15 mils. The density is about 1.53 grams per cc. The tube is considered to be well-suited for impregnation and subsequent graphitization to prepare it for use as a component of a nuclear fuel element for a high-temperature gas-cooled reactor.

Example II

Another four foot long graphite tube having the same dimensions is prepared using the same steps set forth in Example I. A green spacer ring is made of the same composition mix as the graphite billet. The spacer ring is about one inch wide and about 0.100 inch in thickness. The inner diameter of the spacer ring measures about 3.530 inches, about 5 mils larger than the outer diameter of the green tube. A light coating of coal tar pitch dissolved in trichloroethylene is applied to the inner surface of the ring and to the location on the green tube where the ring is to be positioned.

After the ring is slipped over the green tube and held in place until the trichloroethylene evaporates to leave a tacky bond, the tube with the spacer ring attached is placed in a steel container and packed in particulate aluminum oxide under conditions similar to those set forth in Example I, except that the four spacer rods are not employed to position the tube in the precise center of the container. The temperature of the green tube is raised to 550° C. over a period of about two days. It is held at 550° C. for 16 hours, at which time it is cooled within the furnace over a period of 5 hours.

The particulate alumina is removed, and the second baking cycle is carried out exactly the same as it was in Example I. After cooling, the final product is closely examined. It is found to be devoid of any cracks or breaks and is found to have a density of 1.53 grams per cc. The outer diameter measures 3.510±0.003 inches. The inner diameter measures 2.750±0.003 inches. The maximum bow in the tube is 15 mils. The spacer ring is examined and is found to have become integral with the outer surface of the carbonized tube.

The resultant product is considered well-suited for impregnation and subsequent graphitization to prepare it as a component for a nuclear fuel element for use in a high temperature gas-cooled nuclear reactor.

Example III

Another green tube is extruded and packed in particulate aluminum oxide as set forth in Example I. It is disposed in a furnace, and the temperature is raised to 500° C. over a period of about two days, as in Example I. However, instead of being baked at this temperature, the temperature is continuously increased about 15° C. per hour. After about another day, the temperature reaches 900° C. The tube is held at 900° C. for about six hours and is then cooled to room temperature over a period of about six hours, as in Example I.

Examination of the tube shows that a significant radial break occurred in the tube which left the tube in two separate pieces. The tube is considered unsuitable for use as a component for a fuel element for high temperature nuclear reactor.

Example IV

The process as set forth in Example III is repeated. After final cooling, the carbonized tube is examined. Examination shows that many cracks occurred in the tube structure both in the exterior lateral surface of the tube and in its interior bore surface. These cracks extended through the tube and left it fragmented into many pieces. The tube is considered unsuitable for further treatment which would prepare it for use as a component of a fuel element for a high temperature nuclear reactor.

Examples I through IV above show that, by the present process, graphite products of substantial length can be manufactured having excellent structural strength and the other requisite physical characteristics that make them especially suitable for use in nuclear reactors which operate at high temperatures, i.e., above about 500° C.

Whereas previously, relatively lengthy periods, measured in weeks, were necessary to produce suitable graphite products, the present invention produces such products in less than a single week. The suitable and unsuitable products resulting from Examples I through IV show that the success of the process in producing elongated products is not due merely to baking in a restrained condition, but that it is the two-cycle baking, in both restrained and unrestrained condition, which produces these excellent results. The overall economics of the process, compared to prior processes, marks the invention as an important advance in this field.

Although the invention has been described and illustrated with reference to various examples, it should be pointed out that the invention is not limited to these processes but includes therein the various modifications which would be considered obvious to one skilled in the art. For example, it is considered to be well within the scope of the invention to include nuclear fuel particles within the initial green mixture and thus produce graphite fuel compacts useful in nuclear reactors. The scope of the invention is defined in the claims appended hereto.

Various of the features of the invention are set forth in the following claims.

What is claimed is:

1. In a process for making graphite products, the steps comprising forming a green article containing carbonaceous material, physically restraining the surfaces of said green article to inhibit deformation, baking said restrained green article at a temperature between about 450° C. and about 600° C., cooling said baked article to ambient temperature and relieving said restraint, and heating said unrestrained article to at least about 850° C.

2. In a process for making graphite products, the steps comprising forming a green article containing carbonaceous material and carbonizable binder, physically restraining the surfaces of said green article to inhibit deformation, baking said restrained green article at a temperature above about 450° C. for sufficient time to drive off at least about 80% of the total volatile portion of the binder, cooling said baked article to ambient temperature and relieving said restraint, and subjecting said unrestrained article to heat treatment at least equivalent to about 850° C. for about 3 hours.

3. In a process for making graphite products, the steps comprising forming a green article containing particulate graphite and a carbonizable binder, physically restraining the surfaces of said green article to inhibit deformation, subjecting said restrained green article to baking at least equivalent to about 500° C. for about 18 hours, cooling said baked article to ambient temperature, relieving said restraint, and subjecting said unrestrained article to heat treatment at least equivalent to about 850° C. for about 3 hours.

4. In a process for making graphite products, the steps comprising forming a green article containing particulate graphite and a carbonizable binder, physically restraining the surfaces of said green article to inhibit deformation, gradually raising the temperature of the restrained green article to at least about 450° C. at no more than about 15° C. per hour, baking said restrained green article at a temperature between about 475° C. and about 550° C. for a time-temperature period equivalent to 500° C. for about 18 hours, cooling said baked article to ambient temperature, relieving said restraint, heating said unrestrained article to about 475° C. over at least about six hours and then gradually increasing the temperature to at least about 850° C. over a period of about one day, and heating said unrestrained article at between about 850° C. and 1000° C. for a time-temperature period at least equivalent to 900° C. for about 4 hours.

5. In a process for making graphite products, the steps comprising forming a green article containing particulate carbonaceous material and a carbonizable binder, physically restraining the surfaces of said green article to inhibit deformation by compacting particulate ceramic material about said green article, baking said restrained green article at a temperature between about 450° C. and about 600° C., cooling said baked article to ambient temperature and removing said particulate ceramic material, and heating said unrestrained article to at least about 850° C.

6. In a process for making graphite products, the steps comprising forming a green article containing particulate graphite and a carbonizable binder, physically restraining the surfaces of said green article to inhibit deformation by compacting particulate ceramic material of a particle size between about 105 microns and about 840 microns about said green article, baking said restrained green article for a time-temperature period sufficient to drive off at least about 80% of the total portion of said binder that is volatilized, cooling said baked article to ambient temperature and removing said particulate ceramic material, and heating said unrestrained article to at least about 850° C. for at least 3 hours.

7. In a process for making graphite products, the steps comprising forming a green article containing a mixture of particulate carbonaceous material and a carbonizable binder, said carbonaceous material constituting at least about 60% by weight of said mixture, physically restraining the surfaces of said green article to inhibit deformation by compacting particulate ceramic material of a particle size between about 105 microns and about 840 microns about said green article, baking said restrained green article for a time-temperature period at least equivalent to about 500° C. for 18 hours, passing a purge flow of an inert gas through said particulate ceramic material during said baking to remove volatiles driven off from said carbonizable binder, cooling said baked article to ambient temperature, removing said particulate ceramic material, and heating said unrestrained article to at least about 850° C. for at least about 3 hours.

8. In a process for making graphite products, the steps comprising forming a green article containing particulate graphite and a carbonizable binder, physically restraining the surfaces of said green article to inhibit deformation by compacting particulate ceramic material of a particle size between about 105 microns and about 840 microns about said green article to an increase in density of about 10% using vibration compaction, baking said restrained green article for a time-temperature period at least equivalent to 500° C. for about 18 hours, cooling said baked article to ambient temperature, removing said particulate ceramic material, heating said unrestrained article to at least about 850° C. for at least about 3 hours.

9. In a process for making graphite products, the steps comprising forming a green article containing particulate graphite and a carbonizable binder, physically restraining the surfaces of said green article to inhibit deformation by compacting particulate ceramic material about said green article to an increase in density of about 10% using vibration compaction, gradually raising the temperature of the restrained green article to at least about 475° C. at a temperature increase of no more than about 15° C. per hour, baking said restrained green article at a temperature between about 475° C. and 550° C. for sufficient time to drive off at least about 80% of the portion of said binder that is volatilized in the process, passing a purge flow of an inert gas through said particulate ceramic material during said baking to remove volatiles driven off from said carbonizable binder, cooling said baked article to ambient temperature, relieving said restraint, heating said unrestrained article to about 475° C. over at least about 6 hours and then gradually increasing the temperature to at least about 850° C. at between about 20° C. and about 100° C. per hour, and subjecting said unrestrained article to heat treatment for a time-temperature period at least equivalent to 900° C. for about 4 hours.

10. A process for making graphite products, which process comprises forming a green article containing particulate graphite and carbonizable binder, said particulate graphite being between about 60% and about 85% by weight of said green article, completely surrounding said green article with particulate aluminum oxide of a particle size of between about 105 microns and about 840 microns, subjecting said surrounded green article to vibration compaction for about 5 minutes to increase the density of said particulate aluminum oxide about 10%, gradually raising the temperature of the restrained green article to about 500° C. over a period of about two days and baking at about 500° C. for about 18 hours while passing a purge flow of about 5 cubic feet per minute of an inert gas through said particulate aluminum oxide to remove volatiles driven off from said carbonizable binder, cooling said baked article to ambient temperature over a period of at least about 5 hours, removing said aluminum oxide, heating said unrestrained article to about 500° C. over about 6 hours and then gradually increasing the temperature to about 900° C. over a period of about one day and then maintaining said temperature of about 900° C. for about 6 hours, passing a purge flow of an inert gas past said unrestrained article during said heating to remove volatiles driven off therefrom, and graphitizing said article.

References Cited

UNITED STATES PATENTS

| | | | |
|---|---|---|---|
| 263,757 | 9/1882 | Brush | 264—105 |
| 263,758 | 9/1882 | Brush | 264—29 |
| 1,036,319 | 8/1912 | Pass et al. | 264—58 X |
| 1,549,867 | 8/1925 | Graueman | 264—29 |
| 1,739,151 | 12/1929 | Johnson | 264—58 |
| 2,529,041 | 11/1950 | Muller | 264—30 X |
| 2,640,787 | 6/1953 | Greaves et al. | 264—65 X |
| 3,010,882 | 11/1961 | Barclay et al. | 264—29 |
| 3,042,594 | 7/1962 | Hauth. | |
| 3,246,056 | 4/1966 | Shea et al. | 264—29 |
| 3,249,964 | 5/1966 | Shaler | 264—29 X |

ROBERT F. WHITE, *Primary Examiner.*

J. A. FINLAYSON, J. R. HALL, *Assistant Examiners.*